Figure 1:
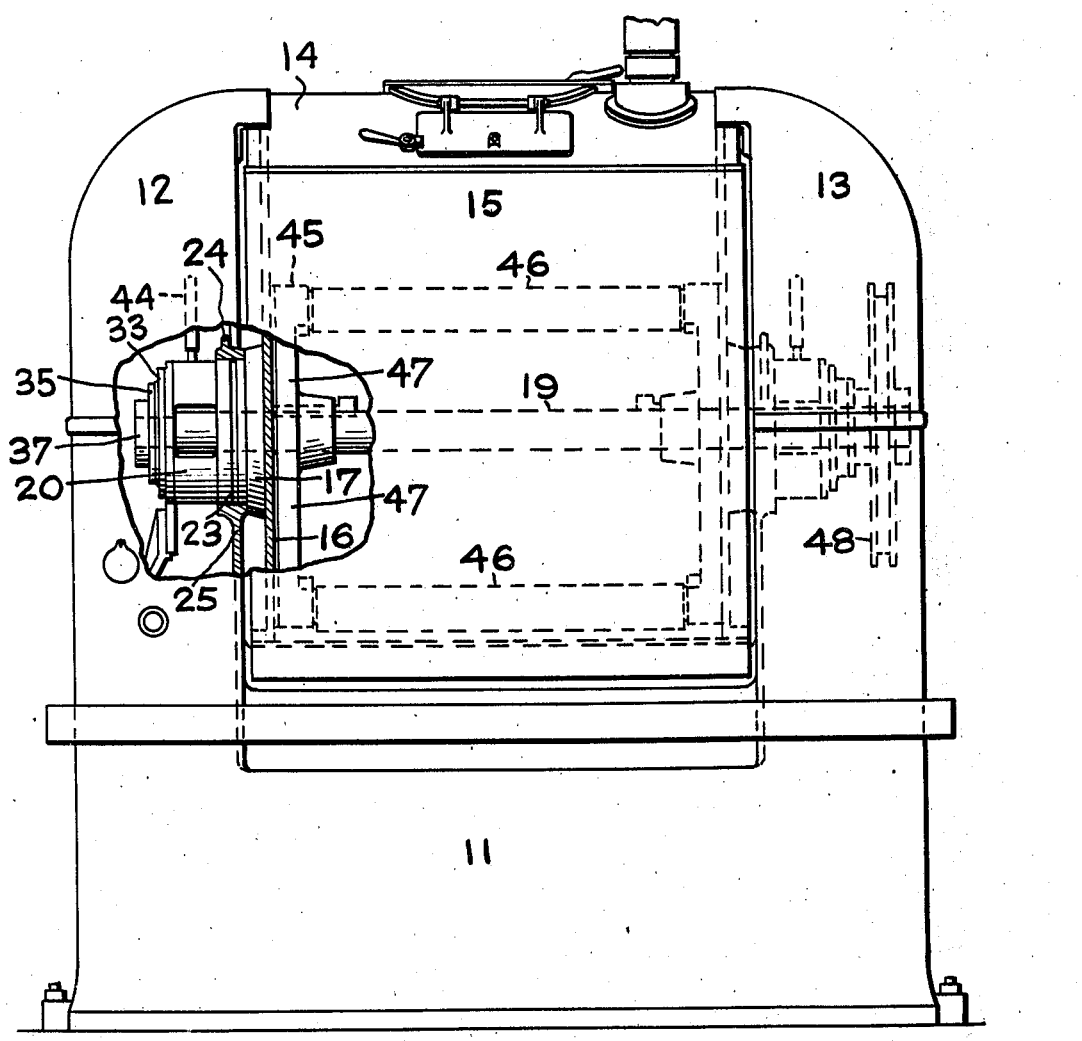

Jan. 25, 1944.  T. J. SHELLENBERGER  2,340,022
SHAFT SEAL
Filed Aug. 15, 1940  2 Sheets-Sheet 1

Inventor
T. J. SHELLENBERGER
By Malcolm T. Gannett
Attorney

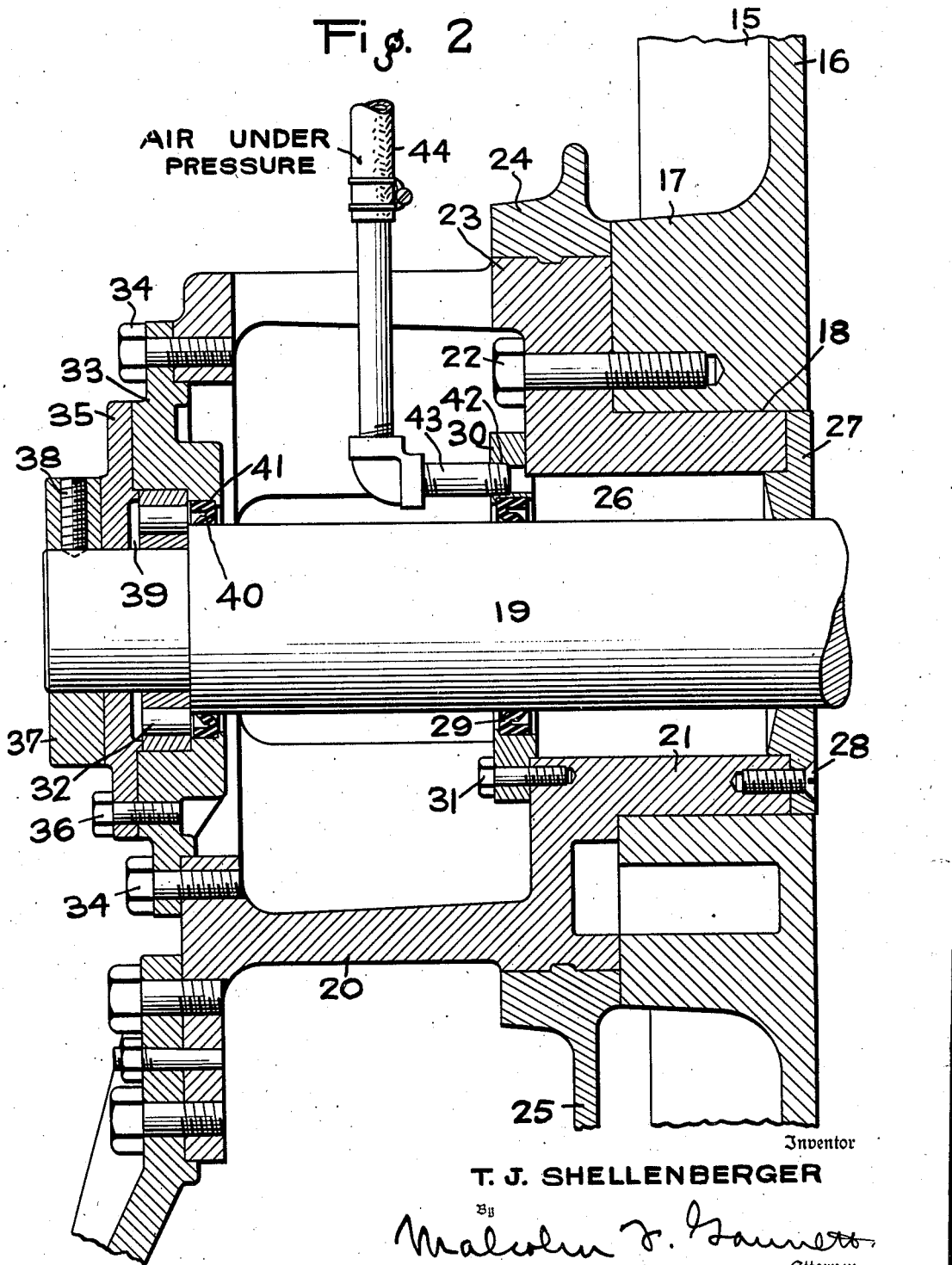

Patented Jan. 25, 1944

2,340,022

UNITED STATES PATENT OFFICE 2,340,022

SHAFT SEAL

Titus James Shellenberger, York, Pa., assignor to Read Machinery Co., Inc., York, Pa., a corporation of Pennsylvania Application August 15, 1940, Serial No. 352,749

2 Claims. (Cl. 308—36.3)

This invention relates to dough mixers and the like, and more particularly to means for sealing the agitator shafts thereof at the joints between the shafts and the journals therefor.

Dough mixing machines have a bowl which may be provided with a trunnion at each end by which the bowl is rotatably mounted so that when the dough is mixed the bowl can be turned or tilted from its mixing position to a discharge position.

Rotatable within the bowl is an agitator which is mounted on a shaft that extends through the trunnions of the bowl. The agitator shaft is adapted to be operated at high speed by mechanism independent of the bowl tilting or rotating mechanism.

The batches of ingredients which are placed in the bowl for mixing consist of dry materials, as well as liquid materials. During the early stages of mixing the batches, due to the action of the agitator, the liquids are thrown around the bowl, and, consequently, it is necessary to have a tight seal at the joints between the agitator shaft and the trunnions of the bowl, in order to retain the liquids within the bowl.

An object of the present invention is to provide an improved means by which the joints between the agitator shaft and the trunnions of the bowl of a mixing machine are sealed.

Another object of the invention is to provide an improved seal for the agitator shaft of a mixing machine which is simple in construction, and reliable and exact in function under all conditions of service.

Another object of the invention is to provide an improved means for sealing the joints between the agitator shaft and the trunnions of the bowl of a mixing machine, in which air under pressure is introduced into a chamber formed in the end of the bowl around the shaft, so that liquid within the bowl is prevented by the high air pressure from flowing outwardly through the joints.

The invention also comprises certain new and useful improvements in the construction, arrangement and combination of the several parts of which it is composed, as will be hereinafter more fully described and claimed.

In the accompanying drawings:

Fig. 1 is an elevation, partly in section, of a dough mixing machine constructed according to the present invention; and Fig. 2 is an enlarged section of a portion of the dough mixing machine in which the trunnion of the bowl is mounted, showing the sealing means for the agitator shaft.

Referring to the drawings, the dough mixing machine may comprise a casing consisting of a base 11, hollow upright ends 12 and 13, and a top 14 which extends between the upper portions of the ends 12 and 13.

Within the space between the base, the ends, and the top, there is a bowl 15 of well known construction. When the bowl 15 is in its mixing position, as shown in Fig. 1, the top 14 provides means for closing the top of the bowl.

The bowl 15 is rotatably supported within the casing for tilting movement through a limited angle of approximately 90°, so that after a batch of dough has been mixed the bowl can be turned to discharge position in a well known manner.

For the purpose of rotatably mounting the bowl 15 in the casing, each end wall 16 of the bowl is formed with a boss 17 having an opening 18 therein.

The opening 18 has a diameter considerably larger than the diameter of the agitator shaft 19.

A cylindrical member 20 having an inner centering hub portion 21 mounted in the opening 18, is secured to the boss 17 by bolts 22.

Adjacent to the hub portion 21, the member 20 is formed with a portion 23 which constitutes the trunnion of the bowl, said trunnion being journalled in a bearing 24 mounted in the wall 25 of the end of the casing of the machine.

The hub portion 21 of the member 20 has an internal diameter somewhat larger than the diameter of the agitator shaft 19 to leave an annular chamber 26 between the shaft and the hub 21.

The inner end of the chamber 26 is closed by means of a plate 27 secured to the inner end of the hub 21 by screws 28. The plate 27 has a central opening fitted with a little clearance on the shaft 19.

The outer end of the chamber 26 is closed by means of a ring packing 29 mounted in an annular plate 30 secured to the hub 21 by cap screws or bolts 31. The ring 29 is made out of suitable material, and as illustrated in Fig. 2, is V-shaped in cross section so that it will expand by pressure applied laterally in the V.

The outer end of the agitator shaft 19 is journalled in a roller bearing 32 mounted in an annular plate 33 fastened to the end of the member 20 by bolts 34. The end of the bearing 32 is closed by a cover plate 35 which is detachably secured to the plate 33 by means of bolts or

2

2,340,022 cap screws 36. The plate 35 is further retained in position by means of a washer 37 secured to the end of the shaft 19 by a set screw 38.

The cover plate 35 is constructed to provide a chamber 39 for the lubricating oil for the bearing 32, and in order to prevent leakage of the oil inwardly of the shaft 19, a ring packing 40 is mounted in an annular grove 41 formed in the plate 33 and disposed around the shaft 19 inwardly with respect to the bearing 32. The packing 40 is similar to the packing 29 heretofore referred to.

In order to introduce air under pressure into chamber 26, the plate 30 is formed with a threaded opening 42 into which is fitted one end of a pipe 43. The pipe 43 is adapted to be connected to a source of air under pressure (not shown) by means of a flexible hose 44 connected to the opposite end of said pipe.

Mounted on the shaft 19 and disposed within the bowl 15 is an agitator 45 of well known type. The agitator comprises a series of elongated rollers 46 carried by arms 47 at each end of the bowl, said rollers being arranged in parallel relationship to the shaft 19, and being adapted to pick up and knead the dough after the ingredients have been thoroughly mixed.

Heretofore, in dough mixing machines of the type shown in Fig. 1, it was the practice to install a packing or stuffing box around the shaft 19 where said shaft passes through the end walls of the bowl. Since the ingredients of the batches of materials being mixed in the bowl consisted of considerable liquid which was thrown violently around the bowl during the initiation of the mixing operation, it was difficult to provide a tight seal by the use of the known types of stuffing boxes or shaft packings, and consequently when the liquid leaked past the packing glands, due to the presence of flour and other materials therein, the packing glands would become gummed and otherwise damaged or rendered unfit, and, therefore, it was necessary to frequently renew or repair the packing material. Also, during the operation of the mixing machine particles of the packing material would work along the shaft, enter the bowl and become mixed with the dough, thereby rendering the dough unfit for use. Thus, by eliminating the packing material of the usual packing gland and substituting therefor the sealing means of the present invention, no foreign matter can enter the bowl as heretofore. Because of the pressure constantly maintained in chamber 26 by air delivered through pipe 43 in an amount greater than the pressure within the bowl 15, the liquid within said bowl is prevented from leaking outwardly through the joint between the opening in the plate 27 around the shaft 19. Any leakage of air from chamber 26 into the bowl 15 will not be injurious to the material undergoing mixing within the bowl, and it is only necessary to maintain sufficient pressure of the air in chamber 26 which will overbalance the pressure within the bowl in order to thoroughly seal the joint at the trunnion of the bowl and prevent the liquid in the bowl from leaking therefrom.

While in Fig. 2 the construction of the shaft seal at the end 12 of the machine is shown, it will be understood that a similar seal for the shaft may be constructed at the end 13. In the end 13, the agitator shaft 19 carries a pulley 48 which may be connected to an electric motor or other suitable source of power not shown.

Having thus described my invention, what I claim is:

1. A device of the class described, comprising a movable member having an end wall with an opening formed therein, a stationary member arranged in spaced relation to the wall of said movable member and having an opening formed therein in alinement with the opening in the end wall of said movable member, the diameter of the opening of said stationary member being somewhat greater than the diameter of the opening in the end wall of said movable member, a cylindrical member fixed to the end wall of said movable member and having a bearing member formed exteriorly on one end thereof and mounted in the opening of said stationary member whereby said cylindrical member and said movable member are free to rotate with respect to said stationary member, an elongated tubular portion projecting from the end of the cylindrical member having said bearing, said tubular portion having an external diameter corresponding substantially to the diameter of the opening in said movable member and being mounted within the opening in said movable member, the internal opening in said tubular portion also extending through the end wall of said cylindrical member having the bearing, a shaft extending through said cylindrical member, its tubular extension and into said movable member, said shaft having a diameter less than the diameter of the opening through the tubular portion to provide an annular chamber substantially coextensive with the portion of the cylindrical member having the tubular extension, and means mounted on each end of said tubular portion and surrounding the shaft for closing the ends of said annular chamber whereby said chamber is unobstructed throughout its length.

2. A device of the class described, comprising a movable member having an end wall with an opening formed therein, a stationary member arranged in spaced relation to the wall of said movable member and having an opening formed therein in alinement with the opening in the end wall of said movable member, the diameter of the opening of said stationary member being somewhat greater than the diameter of the opening in the end wall of said movable member, a cylindrical member fixed to the end wall of said movable member and having a bearing portion formed exteriorly thereon, said bearing portion being mounted in the opening of said stationary member whereby said cylindrical member and said movable member are free to rotate with respect to said stationary member, said cylindrical member having a main body portion extending outwardly from its bearing portion and terminating in an outer end arranged in spaced relation with respect to the stationary member, an elongated tubular portion projecting from the end of the cylindrical member having said external bearing, said tubular portion having an external diameter corresponding substantially to the diameter of the opening in said movable member and being mounted in said opening, the internal opening in said tubular portion terminating at a distance from the outer end of said cylindrical member, a shaft extending through said cylindrical member, its tubular extension and into said movable member, said shaft having a diameter less than the diameter of the internal opening of said tubular portion to provide an annular chamber substantially coextensive with the portion of the cylindrical member having the tubular portion, means mounted on each end of said tubular portion of the cylindrical member and surrounding said shaft for closing the ends of said annular chamber whereby said chamber is unobstructed throughout its entire length, and a bearing mounted in the extreme outer end of said cylindrical portion and disposed in spaced relation to the outer end of said annular chamber for rotatably supporting the outer end portion of said shaft.

TITUS JAMES SHELLENBERGER.